US012105926B2

(12) United States Patent
Yu et al.

(10) Patent No.: US 12,105,926 B2
(45) Date of Patent: Oct. 1, 2024

(54) XR MANIPULATION FEATURE WITH SMART WATCH

(71) Applicant: NTT DOCOMO, INC., Tokyo (JP)

(72) Inventors: Young-Cheol Yu, Palo Alto, CA (US); Yuya Tanaka, Palo Alto, CA (US); Yoji Osako, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 18/119,720

(22) Filed: Mar. 9, 2023

(65) Prior Publication Data
US 2024/0036698 A1    Feb. 1, 2024

Related U.S. Application Data

(60) Provisional application No. 63/393,182, filed on Jul. 28, 2022.

(51) Int. Cl.
*G06F 3/04815*    (2022.01)
*G04G 21/08*    (2010.01)
(Continued)

(52) U.S. Cl.
CPC ......... *G06F 3/04815* (2013.01); *G04G 21/08* (2013.01); *G06F 3/012* (2013.01);
(Continued)

(58) Field of Classification Search
CPC ................ G06F 3/011; G06F 3/04815; G06F 2203/04802; G06F 3/014; G06F 3/017;
(Continued)

(56) References Cited

U.S. PATENT DOCUMENTS

2010/0141684 A1*  6/2010  Machida ............... G06F 3/017
                                                          345/173
2011/0007008 A1    1/2011  Algreatly
(Continued)

FOREIGN PATENT DOCUMENTS

JP            6684559 B2    4/2020

OTHER PUBLICATIONS

Notice of Reasons for Refusal received for Japanese Patent Application No. 2023-042859, mailed on May 7, 2024, 13 pages (6 pages of English Translation and 7 pages of Original Document).

*Primary Examiner* — Sanjiv D. Patel
(74) *Attorney, Agent, or Firm* — Womble Bond Dickinson (US) LLP

(57) ABSTRACT

A method and apparatus for controlling objects being displayed in a user interface (UI) in a virtual environment generated by an XR device using a wearable device are described. In some embodiments, the method comprises: receiving selection of an object in the UI being displayed in a virtual environment created by an extend reality (XR) device; displaying, in the UI, a menu having one or more graphical user interface (GUI) elements selectable using a wearable device; receiving and translating first touch input data indicative of a user selection of one of the one or more GUI elements, the first touch input data being received in response to a user touching the wearable device; receiving additional touch input data from the wearable device and translating the additional touch data into one or more actions associated with the selected GUI element that is to be performed with respect to the object; and performing the one or more actions on the object in the UI being displayed in the virtual environment, including updating the UI based on results of performing the one or more actions.

19 Claims, 13 Drawing Sheets

(51) Int. Cl.
*G06F 3/01* (2006.01)
*G06F 3/0482* (2013.01)
*G06F 3/04845* (2022.01)
*G06F 3/0488* (2022.01)

(52) U.S. Cl.
CPC ........ *G06F 3/0482* (2013.01); *G06F 3/04845* (2013.01); *G06F 3/0488* (2013.01)

(58) Field of Classification Search
CPC ...... G06F 3/041–048; G06F 2203/041–04114; H10K 59/40
See application file for complete search history.

(56) References Cited

U.S. PATENT DOCUMENTS

| | | | |
|---|---|---|---|
| 2014/0337749 A1* | 11/2014 | Phang | H04N 21/4886 |
| | | | 715/740 |
| 2017/0076502 A1* | 3/2017 | Chen | G06F 3/011 |
| 2017/0076503 A1* | 3/2017 | Tamaoki | G06F 3/017 |
| 2019/0146219 A1 | 5/2019 | Rodriguez, II | |
| 2020/0026352 A1* | 1/2020 | Wang | G06F 3/044 |

\* cited by examiner

Rotate(360°)

Pattern 1

Selected Object 451

Smart Watch 452

Users can rotate the selected object with move a finger like drawing circle.

Finger 453

FIG. 4C

Pattern 2

Selected Object 454

Smart Watch 455

Fingers 456

Users can rotate the selected object with move two fingers like drawing circle.

FIG. 4D

XR MANIPULATION FEATURE WITH SMART WATCH

PRIORITY

The present application claims the benefit of U.S. Provisional Patent Application No. 63/393,182, filed on Jul. 28, 2022 and entitled "XR MANIPULATION FEATURE WITH SMART WATCH", which is incorporated by reference in its entirety.

BACKGROUND

Artificial reality, extended reality, or extra reality (collectively "XR") is a form of reality that has been adjusted in some manner before presentation to a user, which may include, e.g., virtual reality (VR), augmented reality (AR), mixed reality (MR), hybrid reality, or some combination and/or derivatives thereof. Various XR environments exist, allowing representations of users to move about and speak with one another. However, the user interface (UI) and user experience (UX) are limited. For example, the user interfaces often rely on hand tracking that doesn't always operate effectively and may even be uncomfortable for users.

SUMMARY

The present disclosure is directed to controlling objects being displayed in a user interface (UI) in a virtual environment generated by an XR device using a wearable device, substantially as shown in and/or described in connection with at least one of the Figures, as set forth more completely in the claims.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIGS. 4C and 4D illustrate using a smart watch to rotate a selected object.

DETAILED DESCRIPTION

Figure 1:
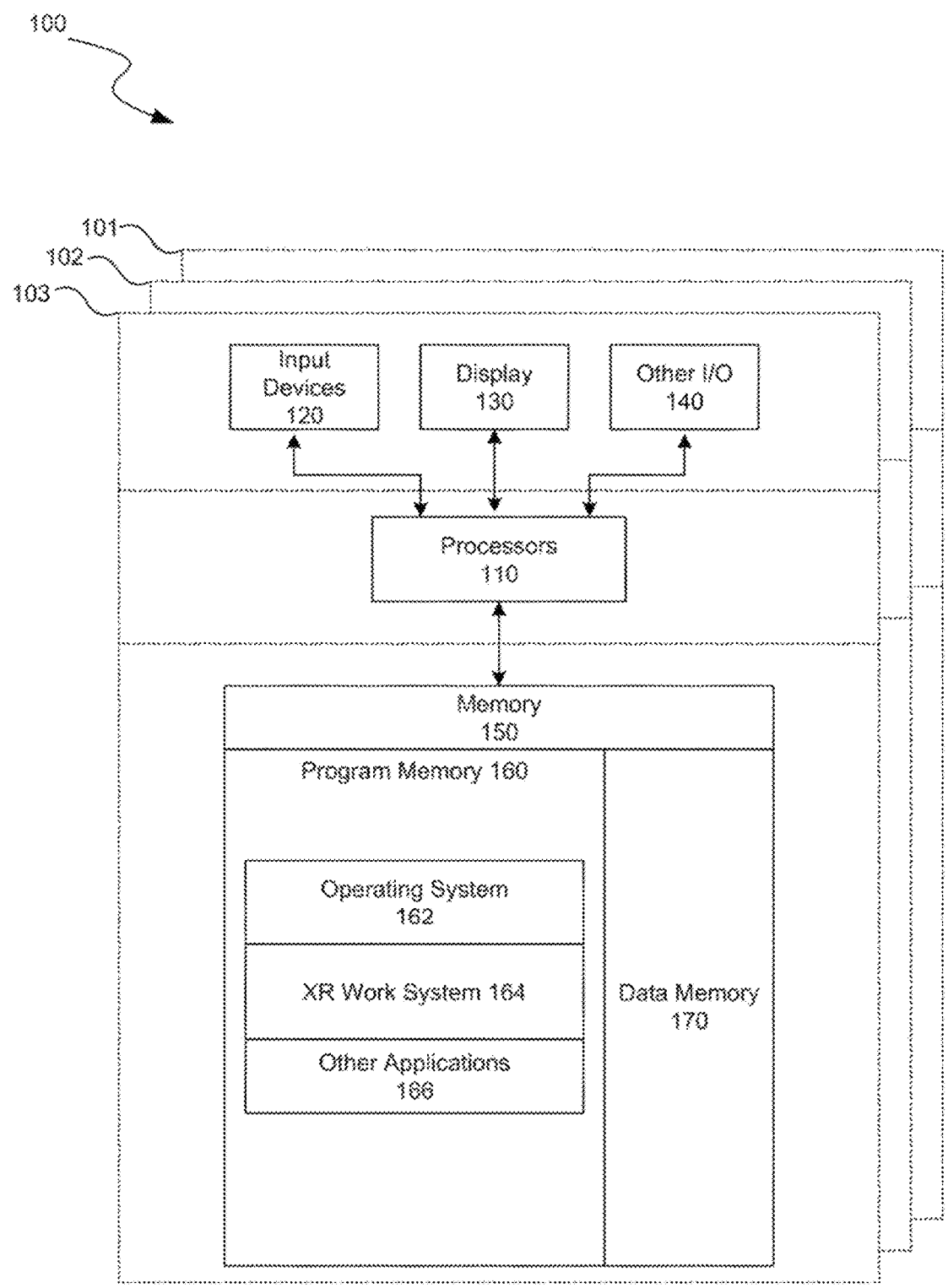
FIG. 1 is a block diagram illustrating an overview of devices on which some implementations of the disclosed technology can operate

In the following description, numerous details are set forth to provide a more thorough explanation of the present disclosure. It will be apparent, however, to one skilled in the art, that the present disclosure may be practiced without these specific details. In other instances, well-known structures and devices are shown in block diagram form, rather than in detail, to avoid obscuring the present disclosure.

A method and apparatus for controlling objects being displayed in a user interface (UI) in a virtual environment generated by an artificial reality, extended reality, or extended reality (collectively "XR") system, or device, using a wearable device are described. In some embodiments, the XR devices receives selection of an object in the UI being displayed in a virtual environment created by the XR device and displays a menu having one or more graphical user interface (GUI) elements selectable by a user using a wearable device. The XR device then receives touch data from the wearable device that indicates menu item selections and/or actions to be performed on objects being displayed in a virtual environment created by the XR device. The XR device may be implemented as a head-mounted display (HMD) system, an example of which is described below.

Embodiments of the disclosed technology may include or be implemented in conjunction with XR, which is a form of reality that has been adjusted in some manner before presentation to a user, which may include, e.g., virtual reality (VR), augmented reality (AR), mixed reality (MR), hybrid reality, or some combination and/or derivatives thereof. Extended reality content may include completely generated content or generated content combined with captured content (e.g., real-world photographs). Additionally, in some embodiments, extended reality may be associated with applications, products, accessories, services, or some combination thereof, that are, e.g., used to perform activities in an artificial reality. The extended reality system that provides the extended reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real-world after they have passed through a computing system. For example, a tablet with a camera on the back can capture images of the real-world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real-world. For example, a MR headset could be shaped as a pair of glasses with a pass-through display, which allows light from the real-world to pass-through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Several implementations are discussed below in more detail in reference to the figures. FIG. 1 is a block diagram illustrating an overview of devices on which some implementations of the disclosed technology can operate. The devices can comprise hardware components of a computing system 100 that can create, administer, and provide interaction modes for an XR environment. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye or head direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, XR work system 164, and other application programs 166. Memory 150 can also include data memory 170 that can include information to be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
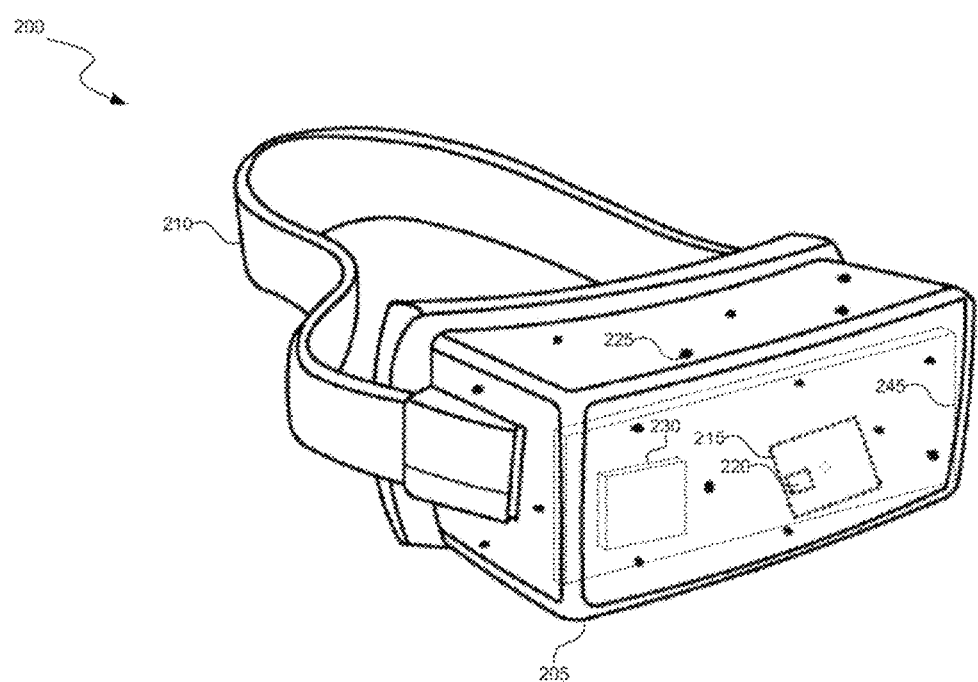
FIG. 2A is a wire diagram of a head-mounted display (HMD) in accordance with some embodiments.

FIG. 2A is a wire diagram of a head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real-world and in a virtual environment in three degrees of freedom (3DoF) or six degrees of freedom (6DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
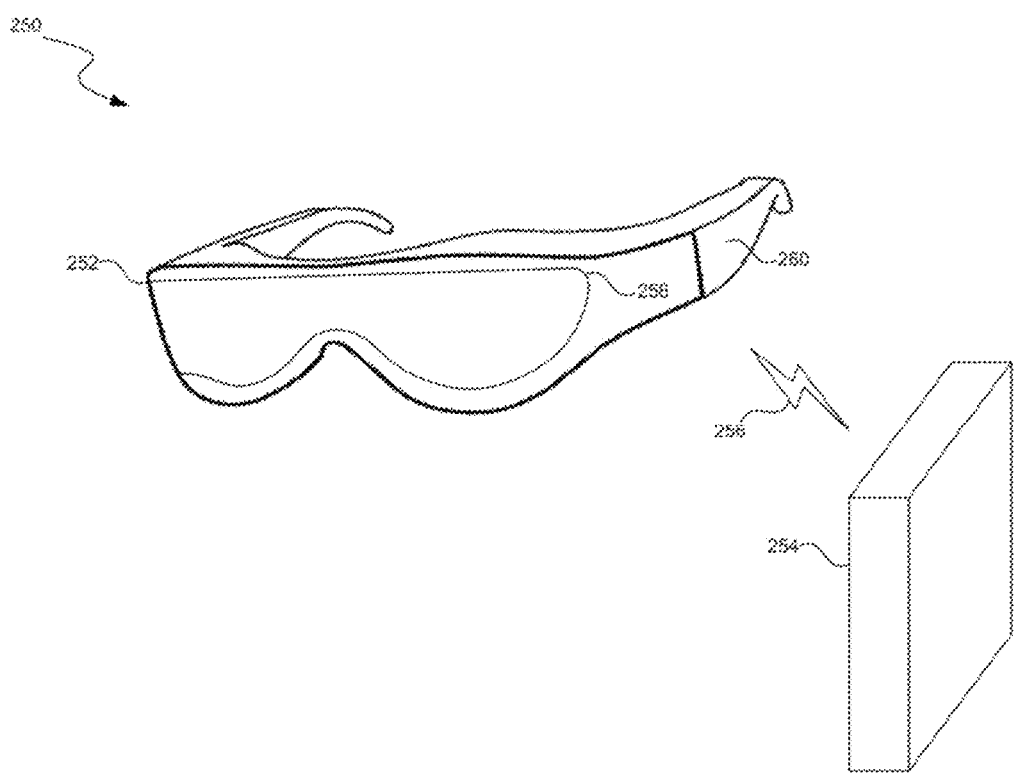
FIG. 2B is a wire diagram of a mixed reality HMD system which includes a mixed reality HMD and a core processing component.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real-world.

Similarly, to the HMD 200, the HMD system 250 can also include motion and position tracking units, cameras, light sources, etc., which allow the HMD system 250 to, e.g., track itself in 3DoF or 6DoF, track portions of the user (e.g., hands, feet, head, or other body parts), map virtual objects to appear as stationary as the HMD 252 moves, and have virtual objects react to gestures and other real-world objects.

In various implementations, the HMD 200 or 250 can also include additional subsystems, such as an eye tracking unit, a head tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

XR Manipulation Feature with a Smart Watch

Currently, in order for users to manipulate objects being displayed in a user interface of an XR device, the XR device performs hand tracking on the user to watch their hands. This requires the user to put their hands on a hand tracking detachable area, which is uncomfortable after long usage. Also, in other XR devices, smart phones are used as controllers, which requires that the user to conscious bring the smart phone with them all the time. In current XR devices, there are no ways to use a smart watch device to manipulate a user interface being displayed by an XR device.

In some embodiments, a user can select objects in a display of a user interface using a combination of head tracking and a smart watch device. In some embodiments, in this case, the role of the head tracking role is to direct a cursor being displayed in the user interface while the role of the smart watch is to provide a button for selecting an object at the position of the cursor. In this way, the user can manipulate objects with the smart watch as a controller, such as, for example, moving, rotating, and/or or scaling the objects. In some embodiments, the head tracking is used to identify the object at which the user is looking and the smart watch is used to select (e.g., by tapping the center of the smart watch) and then manipulate the object thereafter using only the watch device. This is more accurate than current existing UI/UX implementations for XR devices, where the manipulation is not accurate. In this case, manipulating objects with a smart watch is very convenient because the users need only wear the smart watch and are provided with the ability to highly accurately manipulate those objects because the physical display of the watch is tangible.

In some embodiments, the XR device manipulates objects in two modes, one mode in which one finger is used to manipulate (e.g., move, rotate, scale, etc.) an object and a second mode in which two or more fingers are used to manipulate an object. In some embodiments, the manipulation includes moving, rotating or scaling an object.

In some embodiment, the smart watch and the XR device are communicably connected so that touch data from the smart watch is sent to the XR device wirelessly and acted upon by the XR device. In this case, the touch data sent from the smart watch is translated into commands that are performed by the XR device. The wireless communication is short range wireless communication (e.g., Bluetooth, etc.).

Figure 3A:
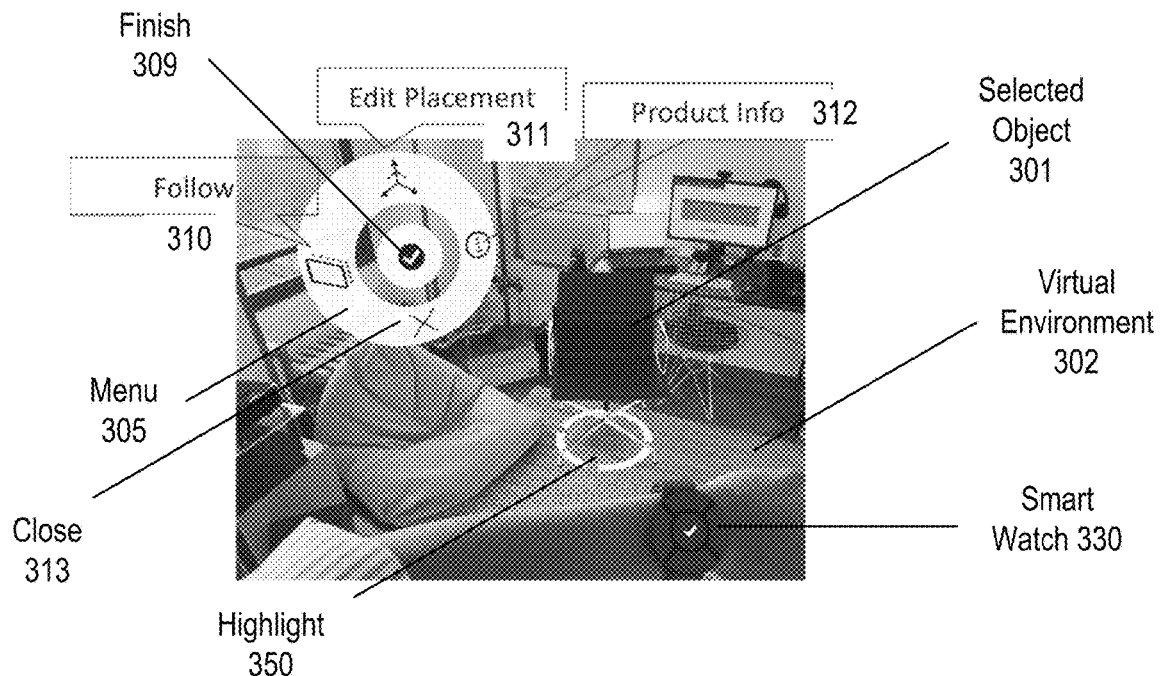
FIGS. 3A and 3B illustrate manipulating objects with a smart watch in conjunction with a virtual controller that is displayed in the user interface of the XR device.
Figure 3B:
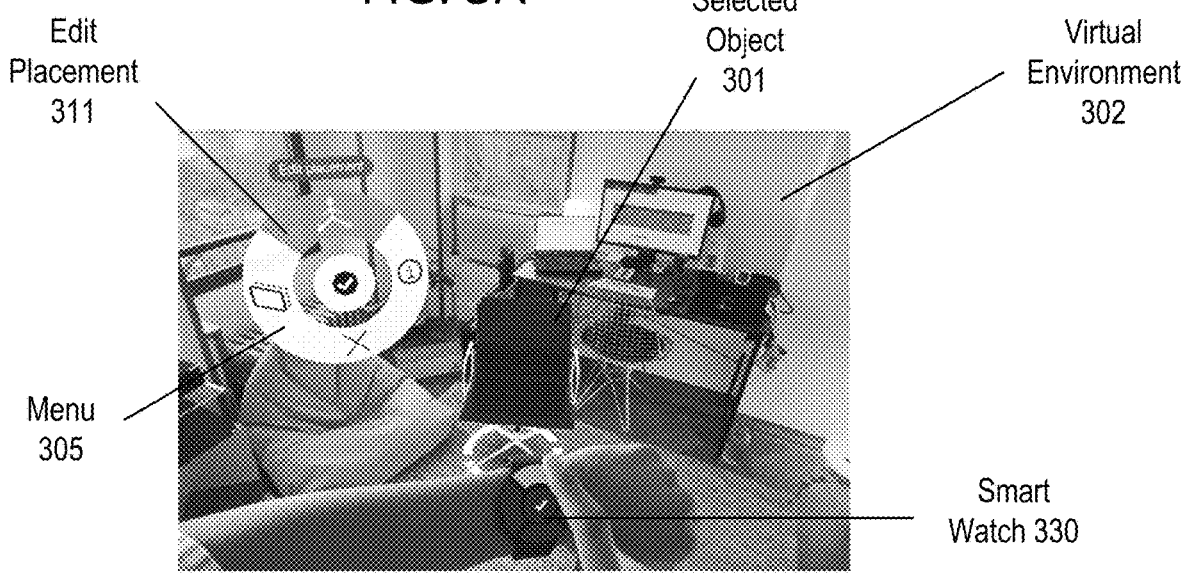

FIGS. 3A and 3B illustrate manipulating objects with a smart watch in conjunction with a virtual controller that is displayed in the user interface of the XR device. In this way, the user manipulates the objects with a smart watch as a controller. Referring to FIG. 3A, when the XR device determines the user is looking at an object for a predetermined period of time (e.g., 1 second, 2 seconds, etc.), such as object (chair) 301, in the user interface of a virtual environment 302 via head tracking, the XR device displays a pop-up menu 305 in the user interface. In some embodiments, menu 305 includes a select (checkmark) button 309 in the center with a follow button 310, an edit placement button 311, a product information button 312, and an "X" button 313 displayed around the select button.

The edit placement button 311 allows users to manipulate objects (e.g., move an object, rotate an object, scale an object, etc.) and is selected by touching a location on the display surface of smart watch 330 that corresponds to the edit placement button 311. The product information button 312 causes the XR device to show information about the selected object, such as, for example, descriptions of the object (e.g, size, weight, price, etc.), and is selected by touching a location on the display surface of smart watch 330 that corresponds to the product information button 312. The follow button 310 causes the XR device to make the selected object follow the user's position and is selected by touching a location on the display surface of smart watch 330 that corresponds to the follow button 310. That is, in some embodiments, after selecting the follow button 310 by touching the corresponding location on the display surface of the smart watch, the selected object moves along the path the user is looking in the virtual environment as determined by head tracking. The X button 313 can be selected to close the pop-up menu and have it disappear from the user interface in the virtual environment.

In some embodiments, the pop-up menu 305 is displayed in response to the head tracking determining a user's looking at an object in the user interface of the virtual environment. In FIG. 3A, the head tracking determines that the user's looking at the chair and highlights (358) the chair as the user is looking at the chair. Thereafter, the pop-up menu 305 is shown and enables the user to select actions using the smart watch 330 that can be performed by the XR device with respect to the chair. FIG. 3B illustrates the user using the smart watch 330 to select the edit placement button 311 to allow the user to manipulate the chair that is being currently selected based on the head tracking performed by the XR device. In response to sliding their finger along the display surface of the smart watch 330 in the area of the edit placement button 311, touch data captured by the touch sensor of the smart watch 330 is sent to the XR device indicating that the user desires to manipulate the chair object in the display.

FIGS. 4A-4F illustrate examples of manipulating an object with a smart watch in response to the user selecting an edit placement button (e.g., edit placement button 311 of FIGS. 3A and 3B) in a pop-up menu (e.g., menu 305 in FIGS. 3A and 3B) displayed by the XR device and selected with the smart watch. Referring to FIGS. 4A-4F, after the user has selected the edit placement button, the user may swipe their finger or fingers across the display interface (surface) of the smart watch device to move a selected object, rotate the selected object, or scale the selected object.

Figure 4A:
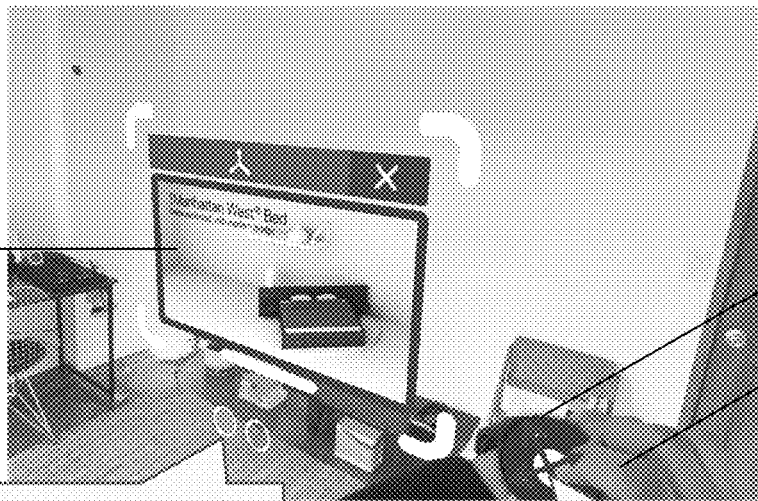
FIGS. 4A and 4B illustrate using a smart watch to move a selected object.
Figure 4B:

FIGS. 4A and 4B illustrate using a smart watch to move a selected object. In some embodiments, in a first mode, the position of the objects controlled by using the smart watch display interface and is performed using a single finger swiping across the display surface of the smart watch. In some embodiments, prior to moving an object, the user indicates two axes of XYZ axis 470 the finger movements across the display surface of the smart watch will control. For example, if the user selects XY axis mode using button 480 of FIG. 4A, then movement of the user's finger across the display surface of the smart watches causes movements of the object in the X and Y directions, and if the user selects ZY axis mode using button 481 of FIG. 4B, then movement of the user's finger across the display surface of the smart watches causes movements of the object in the Z and Y directions. In some embodiments, processing logic detects a selection of an object by head or eye tracking. In some other embodiments, processing logic detects a selection of an object by via tapless selection by determining hand position of the user has been maintained in a position that that is directed at the object for a predetermined time. In some other embodiments, processing logic detects a selection of one or more objects in the UI in the virtual environment by tracking the hand and thumb or finger position of the user. In some other embodiments, the processing logic detects a selection of one or more objects in the UI in the virtual environment by a controller of the XR device.

Referring to FIG. 4A, in this mode, in some embodiments, the user can move the object in the XY axis of XYZ axis 470 to different positions. For example, the XR device moves object 461 in the X and Y directions in the user interface of the virtual environment when the user slides their finger 463 on the display interface of smart watch 462 in X and Y directions. For example, XR device moves object 461 along the X axis when sliding their finger left and right and moves object 461 along the Y axis when sliding their finger up and down. When any of these motions occurs, touch data captured by the touch sensor of the display interface of smart watch 462 is sent to the XR device where it is translated into commands that are performed by the XR device to move object 461 accordingly. Note that other single finger movements and directions can be designated to move an object.

Referring to FIG. 4B, in a second mode, the user uses a single finger to position an object in the ZY axis mode. Referring to FIG. 4B, in this mode, in some embodiments, the user can move the object in the ZY axis of XYZ axis 470 to different positions. For example, the XR device moves object 464 in the Z and Y directions in the user interface of the virtual environment when the user slides their finger 466 on the display interface of smart watch 465 in Z and Y directions. For example, XR device moves object 464 along the Z axis when sliding their finger left and right and moves object 464 along the Y axis when sliding their finger up and down. When any of these motions occurs, touch data captured by the touch sensor of the display interface of smart watch 465 is sent to the XR device where it is translated into commands that are performed by the XR device to move object 466 accordingly. Note that other single finger movements and directions can be designated to move an object.

In FIGS. 4C, in a first mode, after selecting the edit placement button, the user can swipe a single finger in a circular motion around the display surface of the smart watch device to cause the selected object to rotate in the user interface displayed by the XR device. For example, the XR device rotates object 451 in a clockwise direction in the user interface of the virtual environment when the user slides their finger 453 around the display interface of smart watch 452 in a clockwise direction and rotates the size of object 451 in a counter-clockwise direction in the user interface of the virtual environment when the user slides their finger 453 in a counter-clockwise direction on the display interface of smart watch 452. When either these circular motions occurs, touch data captured by the touch sensor of the display interface of smart watch 452 is sent to the XR device where it is translated into commands that are performed by the XR device to rotate object 451 accordingly. Note that other single finger movements and directions can be designated to rotate an object.

FIG. 4D illustrates a second mode in which the user can rotate a selected object using a single finger or two fingers by moving them in a circular direction around the display surface of the smart watch. For example, the XR device rotates object 454 in a clockwise direction in the user interface of the virtual environment when the user slides their two fingers 456 around the display interface of smart watch 455 in a clockwise direction and rotates the size of object 454 in a counter-clockwise direction in the user interface of the virtual environment when the user slides their fingers 456 in a counter-clockwise direction on the display interface of smart watch 455. When either these circular motions occurs, touch data captured by the touch sensor of the display interface of smart watch 455 is sent to the XR device where it is translated into commands that are performed by the XR device to rotate object 454 accordingly. Note that other multi-finger movements and directions can be designated to rotate an object.

Figures 4E, 4F:
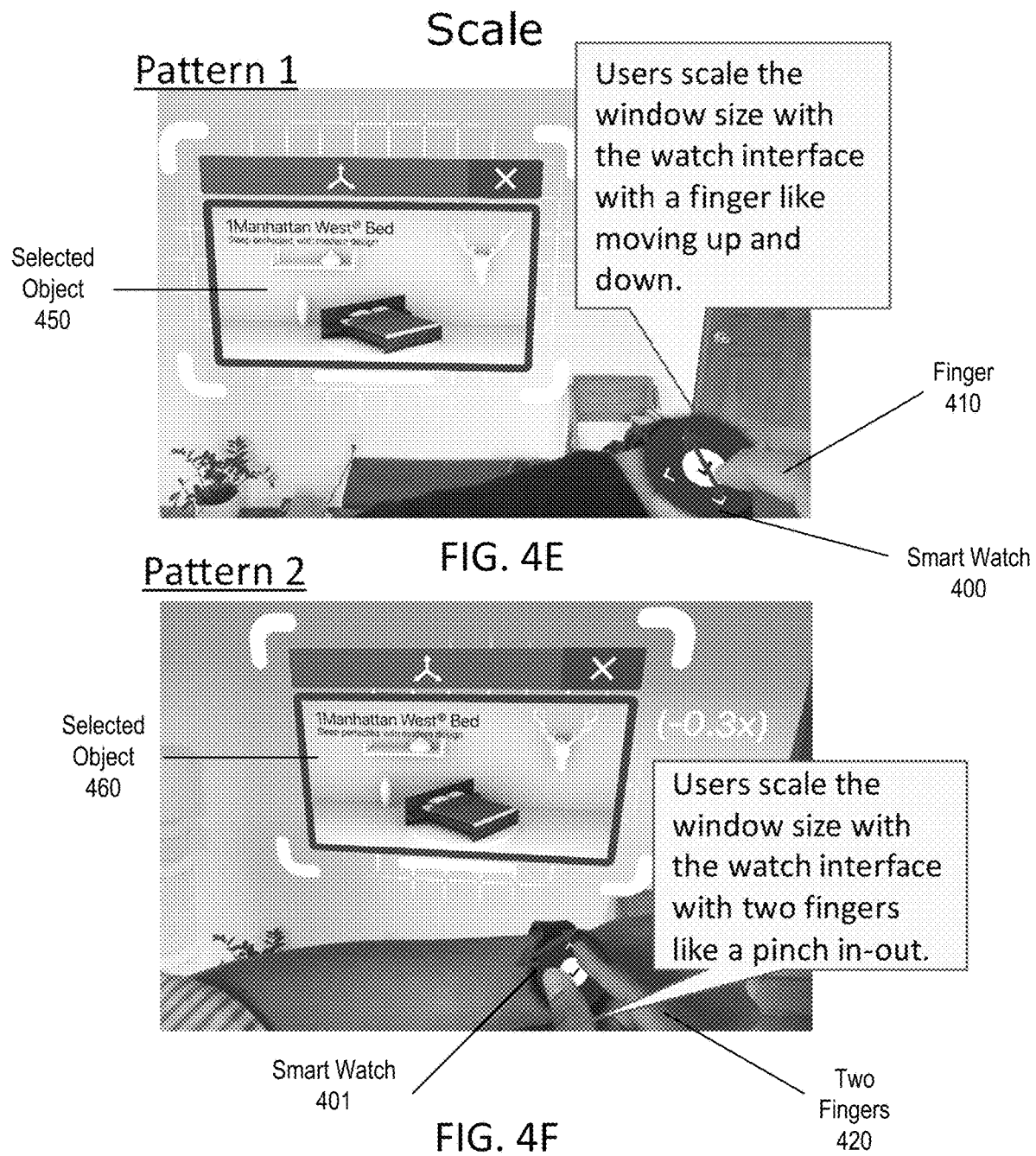
FIGS. 4E and 4F illustrate using a smart watch to scale a selected object.

FIGS. 4E and 4F illustrate examples of using the smart watch to perform scaling on the object. Referring to FIG. 4E, in a first mode, after selecting the edit placement button and selecting the scaling operation, the user moves a single finger up and down in order to scale an object's size with the smart watch interface. For example, the XR device increases the size of object 450 in the user interface of the virtual environment when the user slides their finger 410 upward on the display interface of smart watch 400 and decreases the size of object 450 in the user interface of the virtual environment when the user slides their finger 410 downward on the display interface of smart watch 400. When either these upward or downward motions occurs, touch data captured by the touch sensor of the display interface of smart watch 400 is sent to the XR device where it is translated into commands that are performed by the XR device to scale object 450 accordingly. Note that other single finger movements can be designated to increase the size of an object and decrease the size of an object. For example, the user can move the single finger left and right to increase and decrease, respectively, the size of an object. Note that the movements need not be in opposite directions to cause an object to be scaled up or down.

Referring to FIG. 4F, in a second mode, after selecting the edit placement button and selecting the scaling operation, the user scales the size of an object being displayed the user interface of a virtual environment by using two fingers in a pinching movement (i.e., moving two fingers closer together or farther apart). For example, the XR device increases the size of object 460 in the user interface of the virtual environment when the user moves fingers 420 farther apart (a reverse pinching motion) on the display interface of smart watch 401 and decreases the size of object 460 in the user interface of the virtual environment when the user moves fingers 420 in a pinching motion on the display interface of smart watch 401. When either these reverse pinching or pinching motions occurs, touch data captured by the touch sensor of the display interface of smart watch 400 is sent to the XR device where it is translated into commands that are performed by the XR device to scale object 450 accordingly. Note that other multi-finger movements can be designated to increase the size of an object and decrease the size of an object.

Figure 5:
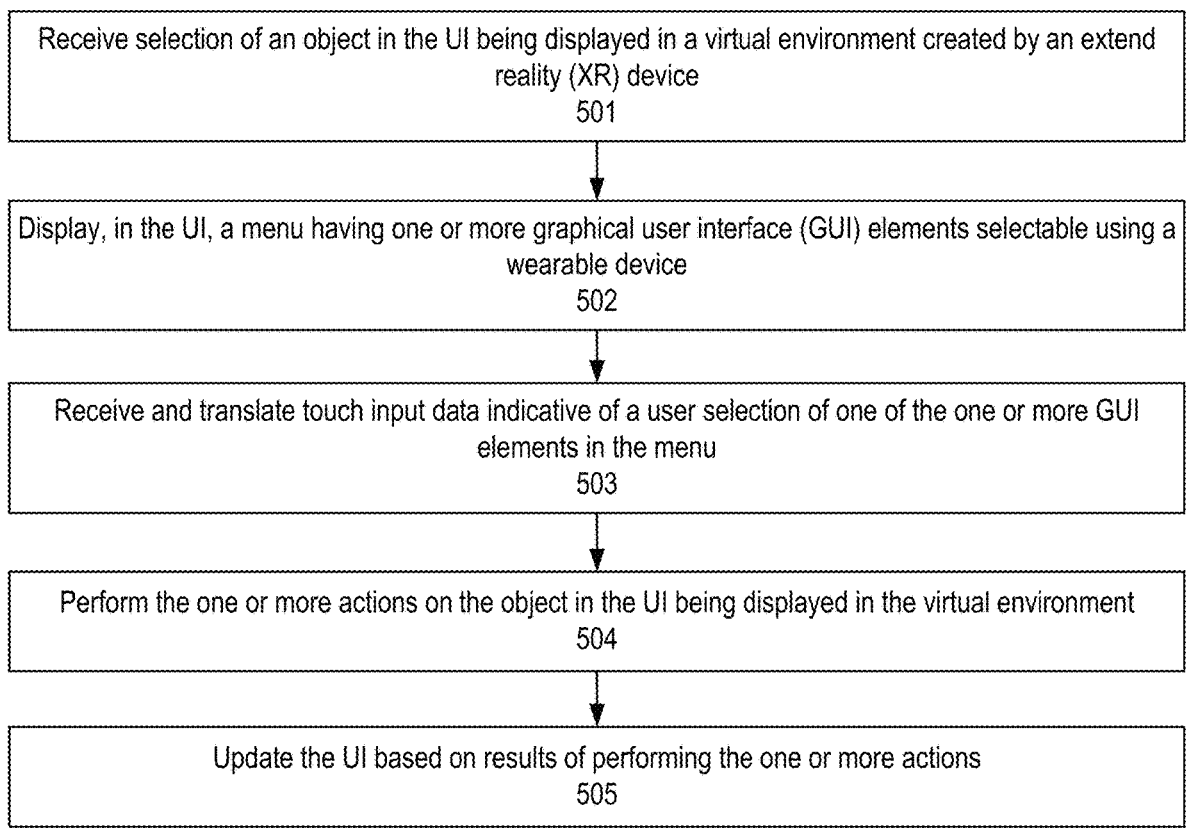
FIG. 5 is a flow diagram of some embodiments of a process for controlling objects being displayed in a user interface (UI) in a virtual environment generated by an XR device using a wearable device.

FIG. 5 is a flow diagram of some embodiments of a process for controlling objects being displayed in a user interface (UI) in a virtual environment generated by an XR device using a wearable device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 5, the process begins by processing logic receiving selection of an object in the UI being displayed in a virtual environment created by an extend reality (XR) device (processing block 501). In some embodiments, processing logic detects a selection of an object by via tapless selection by determining hand position of the user has been maintained in a position that that is directed at the object for a predetermined time. In some other embodiments, processing logic detects a selection of one or more objects in the UI in the virtual environment by tracking the hand and thumb or finger position of the user. In some other embodiments, the processing logic detects a selection of one or more objects in the UI in the virtual environment by a controller of the XR device.

After selection of the object, processing logic displays, in the UI, a menu having one or more graphical user interface (GUI) elements selectable using a wearable device (processing block 502). In some embodiments, the one or more GUI elements comprise one or more of a first GUI element to edit the object and a second GUI element to move the object based on head tracking data. In some embodiments, the menu that is displayed in the menu shown in FIGS. 3A and 3B. In some embodiments, the wearable device comprises a watch. In some embodiments, the watch comprises a smartwatch device and the first touch data and the additional touch data are from a display interface of the smartwatch.

After displaying the menu, processing logic receives and translates touch input data indicative of a user selection of one of the one or more GUI elements in the menu (processing block 503). In some embodiments, this touch input data is received in response to a user touching the wearable device.

After receiving additional touch input data from the wearable device and translating the additional touch data into one or more actions associated with the selected GUI element that is to be performed with respect to the object, processing logic performs the one or more actions on the object in the UI being displayed in the virtual environment (processing block 504) and updates the UI based on results of performing the one or more actions (processing block 505). In some embodiments, the one or more actions comprises changing position of the object, rotating the object, and scaling the object. In some embodiments, the additional touch data for changing the position of the object is from the user moving at least one finger across a display interface of the wearable device. In some embodiments, the additional touch input data comprise touch data produced in response to movement of a single finger or multiple fingers of the user across a display interface of the wearable device.

Figure 6:
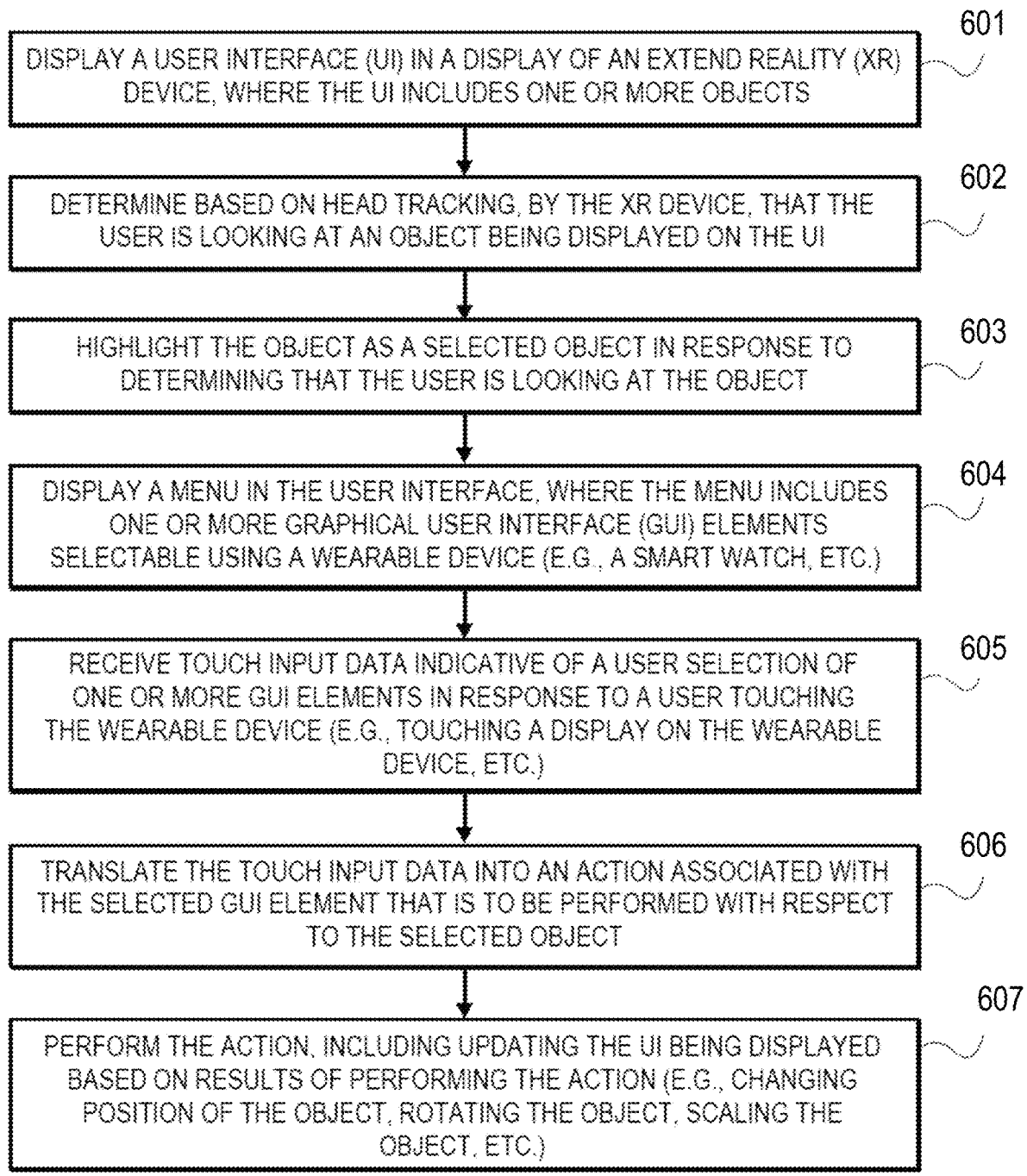
FIG. 6 is a flow diagram of some other embodiments of a process for controlling objects being displayed in a user interface (UI) in a virtual environment generated by an XR device using a wearable device.

FIG. 6 is a flow diagram of some other embodiments of a process for controlling objects being displayed in a user interface (UI) in a virtual environment generated by an XR device using a wearable device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 6, the process begins by processing logic displaying a user interface in a display of an extended reality (XR) device (processing block 601). In some embodiments, the user interface includes one or more objects. Processing logic then determines, based on head tracking performed by the XR device, that the user is looking at an object being displayed on the user interface (processing block 602) and highlights the object as a selected object in response to that determination (processing block 603).

While highlighting the object, processing logic displays a menu in the user interface that includes one or more graphical user interface (GUI) elements that are selectable using a device worn by the user (processing block 604). In some embodiments, the device worn by the user is a watch. In some embodiments, the watch comprises a smart watch. In some other embodiments, the device worn by the user is another wearable device.

Subsequently, processing logic receives touch input data indicative of user selection of one or more of the GUI elements in response to user touching their device (e.g., their smart watch, etc.) (processing block 605). In some embodiments, user touches the display of the smart watch to produce the touch input data that is then sent to the XR device, which is communicably connected to the device worn by the user.

Then, processing logic translates the touch input data into an action associated with the selected GUI element that is to be performed with respect to the object that has been selected by the user in the user interface (processing 606). Thereafter, processing, logic performs the action (processing block 607). In some embodiments, performing the action includes updating the user interface being displayed based on the results of performing that action. Such updates may include changing the position of the selected object, rotating the object and/or scaling the object. Other actions may be performed as well.

Figure 7:
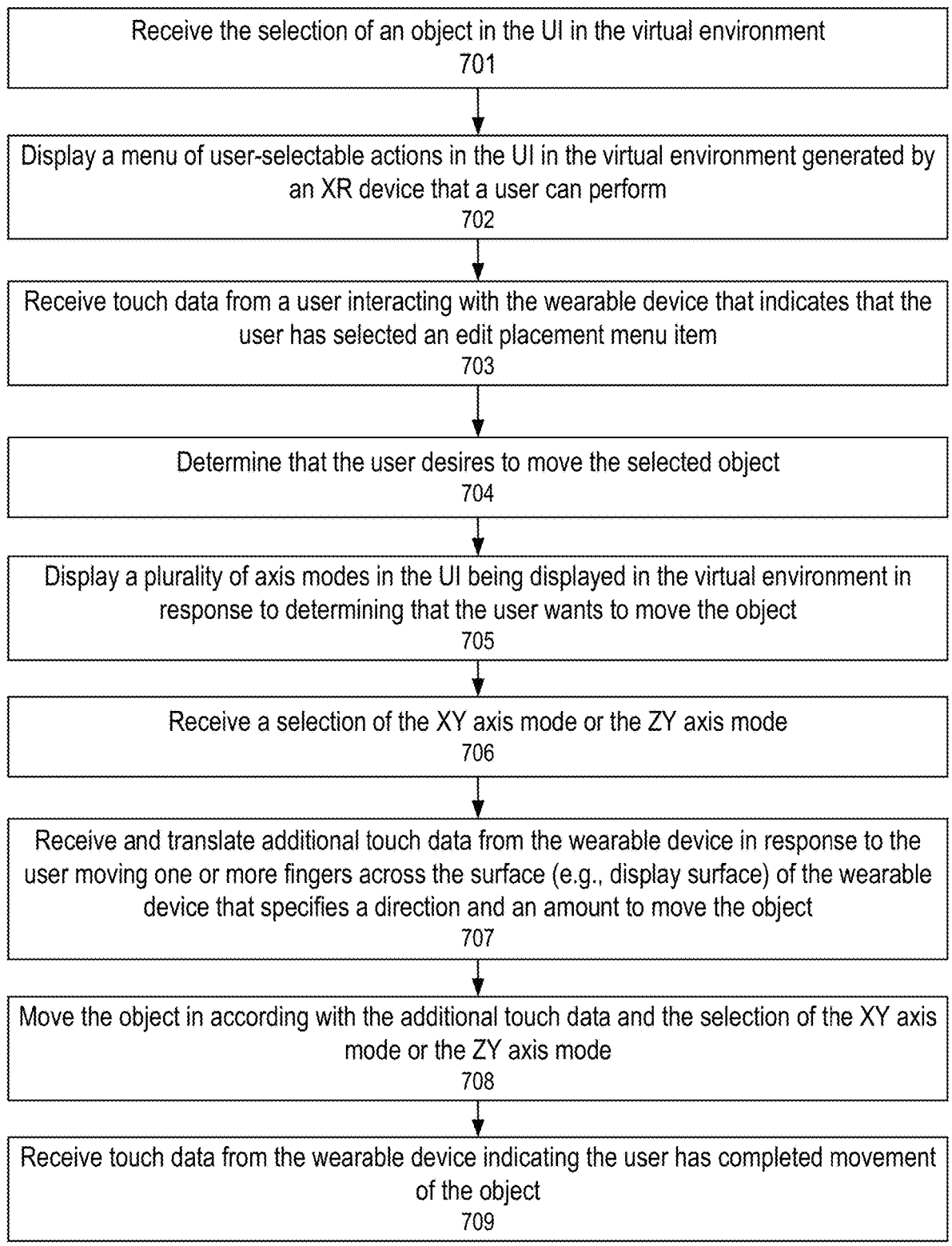
FIG. 7 is a flow diagram of some embodiments of a process for moving an object being displayed in a user interface (UI) in a virtual environment generated by an XR device using a wearable device.

FIG. 7 is a flow diagram of some embodiments of a process for moving an object being displayed in a user interface (UI) in a virtual environment generated by an XR device using a wearable device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 7, the process begins by processing logic receives the selection of an object in the UI in the virtual environment (processing block 701). In some embodiments, the selection of an object by performing head tracking and the XR device determining that the user has been looking at an object for a predetermined period of time (e.g., 2-5 seconds, etc.). In some other embodiments, processing logic detects a selection of an object by via tapless selection by determining hand position of the user has been maintained in a position that that is directed at the object for a predetermined time. In some other embodiments, processing logic detects a selection of one or more objects in the UI in the virtual environment by tracking the hand and thumb or finger position of the user. In some other embodiments, the processing logic detects a selection of one or more objects in the UI in the virtual environment by a controller of the XR device.

In response to selection of an object, processing logic displays a menu of user-selectable actions in the UI in the virtual environment generated by an XR device that a user can perform (processing block 702). The actions in the menu are selectable using the wearable device of the user. An example of such a menu is shown in FIGS. 3A and 3B.

Subsequently, processing logic receives touch data from a user interacting with the wearable device that indicates that the user has selected an edit placement menu item (processing block 703). In some embodiments, the wearable device comprises a smart watch. In some embodiments, the touch data corresponds to the user touching the display interface of the wearable device (e.g., smartwatch) in a position that corresponds to the edit placement menu item of the menu being displayed in the UI in the virtual environment generated by the XR device.

Processing logic determines that the user desires to move the selected object (processing logic 704). In some embodiments, processing logic receives a selection of one of the edit placement operations to be performed on the object.

In some embodiments, processing logic displays a plurality of axis modes in the UI being displayed in the virtual environment in response to determining that the user wants to move the object (processing block 705). In some embodiments, the plurality of axis modes includes an XY axis mode to indicate to the XR device that touch data received from moving one or more fingers across the display interface of the wearable device corresponds to movements in the X and Y axes and an ZY axis mode to indicate to the XR device that touch data received from moving the one or more fingers across the display interface of the wearable device corresponds to movements in the Z and Y axes. In such case, processing logic can also receive a selection of the XY axis mode or the ZY axis mode (processing block 706).

Processing logic receives and translates additional touch data from the wearable device in response to the user moving one or more fingers across the surface (e.g., display surface) of the wearable device that specifies a direction and an amount to move the object (processing block 707) and moves the object in according with the additional touch data and the selection of the XY axis mode or the ZY axis mode (processing block 708). In some embodiments, the touch data is created by the user by moving one finger across the surface of the wearable device. In some other embodiments, the touch data is created by the user by moving two fingers across the surface of the wearable device. Processing logic can receive more touch data from the wearable device as the user repeats the finger movements to indicate additional movements of the object that the user wishes to make.

After the user has moved the object, processing logic receives touch data from the wearable device indicating the user has completed movement of the object (processing block 709). In some embodiments, the touch data is the result of the user pressing the surface of the wearable device at a location designated to indicate that the edit placement operation has been completed by the user (e.g., pressing the center of the wearable device corresponding to the checkmark location (see, for example, the checkmark in FIGS. 3A and 3B), etc.).

Figure 8:
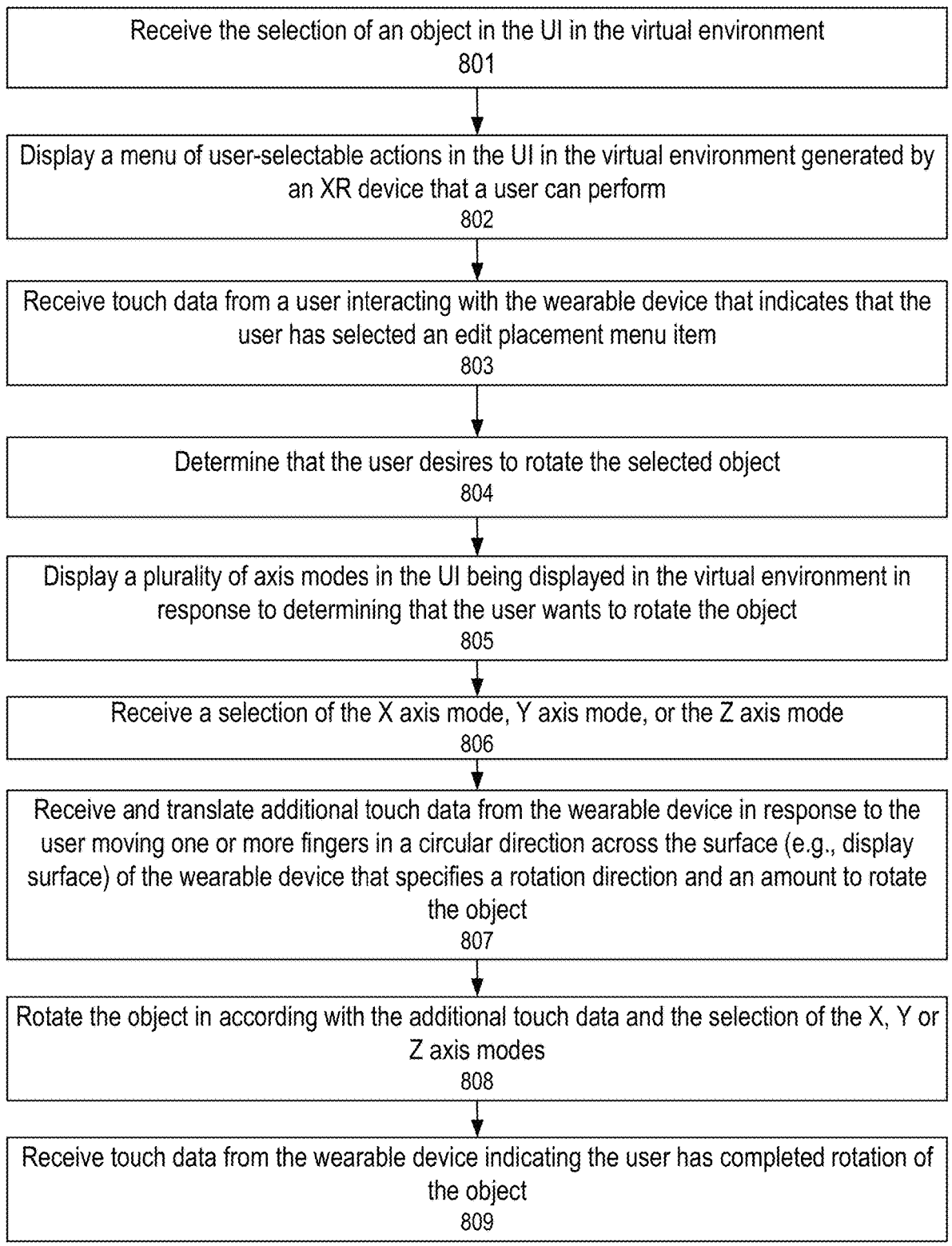
FIG. 8 is a flow diagram of some embodiments of a process for rotating an object being displayed in a user interface (UI) in a virtual environment generated by an XR device using a wearable device.

FIG. 8 is a flow diagram of some embodiments of a process for rotating an object being displayed in a user interface (UI) in a virtual environment generated by an XR device using a wearable device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 8, the process begins by processing logic receives the selection of an object in the UI in the virtual environment (processing block 801). In some embodiments, the selection of an object by performing head tracking and the XR device determining that the user has been looking at an object for a predetermined period of time (e.g., 2-5 seconds, etc.). In some other embodiments, processing logic detects a selection of an object by via tapless selection by determining hand position of the user has been maintained in a position that that is directed at the object for a predetermined time. In some other embodiments, processing logic detects a selection of one or more objects in the UI in the virtual environment by tracking the hand and thumb or finger position of the user. In some other embodiments, the processing logic detects a selection of one or more objects in the UI in the virtual environment by a controller of the XR device.

In response to selection of an object, processing logic displays a menu of user-selectable actions in the UI in the virtual environment generated by an XR device that a user can perform (processing block 802). The actions in the menu are selectable using the wearable device of the user. An example of such a menu is shown in FIGS. 3A and 3B.

Subsequently, processing logic receives touch data from a user interacting with the wearable device that indicates that the user has selected an edit placement menu item (processing block 803). In some embodiments, the wearable device comprises a smart watch. In some embodiments, the touch data corresponds to the user touching the display interface of the wearable device (e.g., smartwatch) in a position the corresponds to the edit placement menu item of the menu being displayed in the UI in the virtual environment generated by the XR device.

Processing logic determines that the user desires to rotate the selected object (processing logic 804). In some embodiments, processing logic receives a selection of one of the edit placement operations to be performed on the object.

In some embodiments, processing logic displays a plurality of axis modes in the UI being displayed in the virtual environment in response to determining that the user wants to rotate the object (processing block 805). In some embodiments, the plurality of axis modes includes an X axis mode to indicate to the XR device that touch data received from moving the one or more fingers across the display interface of the wearable device corresponds to rotations in the X axis, Y axis mode to indicate to the XR device that touch data received from moving the one or more fingers across the display interface of the wearable device corresponds to rotations in the X axis, and an Z axis mode to indicate to the XR device that touch data received from moving the one or more fingers across the display interface of the wearable device corresponds to movements in the Z axes. In such case, processing logic can also receive a selection of the X axis mode, Y axis mode, or the Z axis mode (processing block 806).

Processing logic receives and translates additional touch data from the wearable device in response to the user moving one or more fingers in a circular direction across the surface (e.g., display surface) of the wearable device that specifies a rotation direction and an amount to rotate the object (processing block 807) and rotates the object in according with the additional touch data and the selection of the X, Y or Z axis modes (processing block 808). In some embodiments, the touch data is created by the user by moving one finger across the surface of the wearable device in a circular direction around the edge of the wearable device display surface. In some other embodiments, the touch data is created by the user by moving two fingers across the surface of the wearable device in a circular direction around the edge of the wearable device display surface. Processing logic can receive more touch data from the wearable device as the user repeats the finger movements to indicate additional rotations of the object that the user wishes to make.

After the user has finished rotating the object, processing logic receives touch data from the wearable device indicating the user has completed rotation of the object (processing block 809). In some embodiments, the touch data is the result of the user pressing the surface of the wearable device at a location designated to indicate that the edit placement operation has been completed by the user (e.g., pressing the center of the wearable device corresponding to the checkmark location (see, for example, the checkmark in FIGS. 3A and 3B), etc.).

Figure 9:
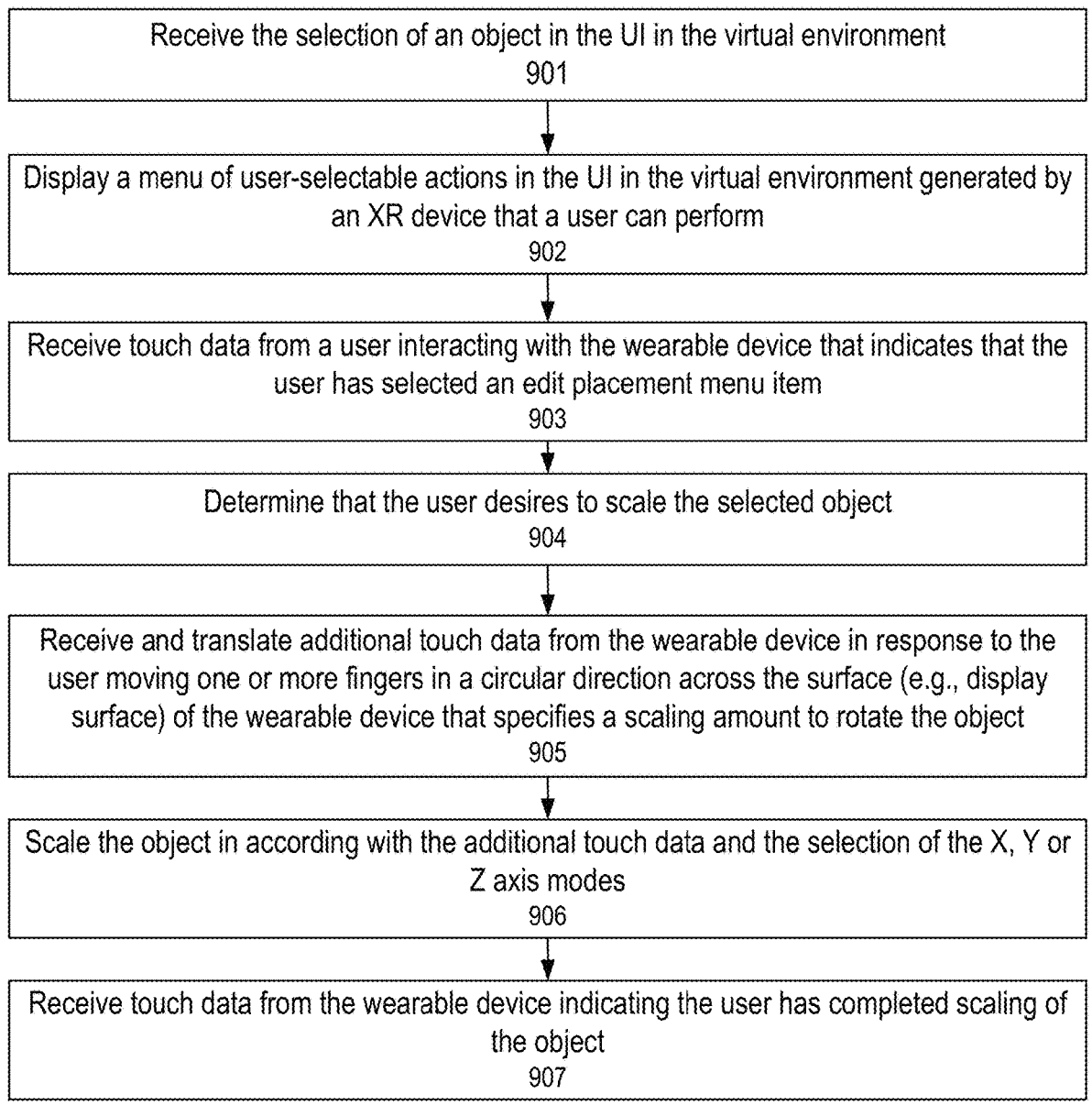
FIG. 9 is a flow diagram of some embodiments of a process for scaling an object being displayed in a user interface (UI) in a virtual environment generated by an XR device using a wearable device.

FIG. 9 is a flow diagram of some embodiments of a process for scaling an object being displayed in a user interface (UI) in a virtual environment generated by an XR device using a wearable device. In some embodiments, the process is performed, at least in part, by processing logic comprising hardware (e.g., circuitry, dedicated logic, etc.), software (e.g., software running on a chip, software run on a general-purpose computer system or a dedicated machine, etc.), firmware, or a combination of the three.

Referring to FIG. 9, the process begins by processing logic receives the selection of an object in the UI in the virtual environment (processing block 901). In some embodiments, the selection of an object by performing head tracking and the XR device determining that the user has been looking at an object for a predetermined period of time (e.g., 2-5 seconds, etc.). In some other embodiments, processing logic detects a selection of an object by via tapless selection by determining hand position of the user has been maintained in a position that that is directed at the object for a predetermined time. In some other embodiments, processing logic detects a selection of one or more objects in the UI in the virtual environment by tracking the hand and thumb or finger position of the user. In some other embodiments, the processing logic detects a selection of one or more objects in the UI in the virtual environment by a controller of the XR device.

In response to selection of an object, processing logic displays a menu of user-selectable actions in the UI in the virtual environment generated by an XR device that a user can perform (processing block 902). The actions in the menu are selectable using the wearable device of the user. An example of such a menu is shown in FIGS. 3A and 3B.

Subsequently, processing logic receives touch data from a user interacting with the wearable device that indicates that the user has selected an edit placement menu item (processing block 903). In some embodiments, the wearable device comprises a smart watch. In some embodiments, the touch data corresponds to the user touching the display interface of the wearable device (e.g., smartwatch) in a position the corresponds to the edit placement menu item of the menu being displayed in the UI in the virtual environment generated by the XR device.

Processing logic determines that the user desires to scale the size of the selected object (processing logic 904). In some embodiments, processing logic receives a selection of one of the edit placement operations to be performed on the object.

Processing logic receives and translates additional touch data from the wearable device in response to the user moving one or more fingers in a circular direction across the surface (e.g., display surface) of the wearable device that specifies a scaling amount to rotate the object (processing block 905) and scales the object in according with the additional touch data and the selection of the X, Y or Z axis modes (processing block 906). In some embodiments, the touch data is created by the user by moving one finger across the surface of the wearable device, where moving the finger in one direction (e.g., upward, downward, left, right, etc.) is performed to increase the size of the object and moving the finger in another direction (e.g., the opposite direction, downward, upward, right, left, etc.) is performed to decrease the size of the object. In some other embodiments, the touch data is created by the user by moving two fingers across the surface of the wearable device together in a pinching motion or apart to indicates whether to increase or decrease the scale of the object. Processing logic can receive more touch data from the wearable device as the user repeats the finger movements to indicate additional scaling of the object that the user wishes to make.

After the user has finished scaling the object, processing logic receives touch data from the wearable device indicating the user has completed scaling of the object (processing block 907). In some embodiments, the touch data is the result of the user pressing the surface of the wearable device at a location designated to indicate that the edit placement operation has been completed by the user (e.g., pressing the center of the wearable device corresponding to the checkmark location (see, for example, the checkmark in FIGS. 3A and 3B), etc.).

As discussed above, in some embodiments, the user interface (UI)/user experience (UX) of the XR device includes a tapless selection feature to select objects, graphical user interface (GUI) elements (e.g., buttons, menus, etc.), or other items in the virtual environment being displayed in the UI of the XR device. In some embodiments, when performing tapless selection, the users don't have to do anything other than keep their hands in position for a predetermined period of time. That is, as long as the person can keep their hand position towards an object the user wants to select for a certain period of time, the XR device is able to determine that the object the user wants to select and makes the selection. As long as the user's hand and/or fingers are paused at a specific position for a predetermined amount of time, users are able to use the tapless selection feature to select menus or icons that are being displayed in the user interface of the XR device. In some embodiments, the predetermined time can be set with variable times. For example, in some embodiments, the predetermined period of time that a user must hold or pause their hand and/or fingers to the specific position is one second or two seconds to select a menu or icon in the user interface of the XR device. In some embodiments, the predetermined time can be set and/or optimized based on the application. In some embodiments, the user interface displays an indicator once the hand and/or fingers are paused or maintained in a specific position. This indicator indicates the amount of time remaining to have the position held in order to perform the tapless selection. In some embodiments, the indicator is a closing circle in which a circle is formed in the user interface from a single point that continues to be drawn in a clockwise (or counterclockwise) direction until the starting point is reached. The time to draw the circle is the time a user needs to hold their hand and/or finger(s) in position to select an item in the user interface. Note that other indicators may be used. An example of an XR device that performs tapless selection is described in, for example, in U.S. Provisional Patent Application Ser. No. 63/393,172, entitled "XR Tapless Selection", filed on Jul. 28, 2022, incorporated herein by reference.

Figure 10:
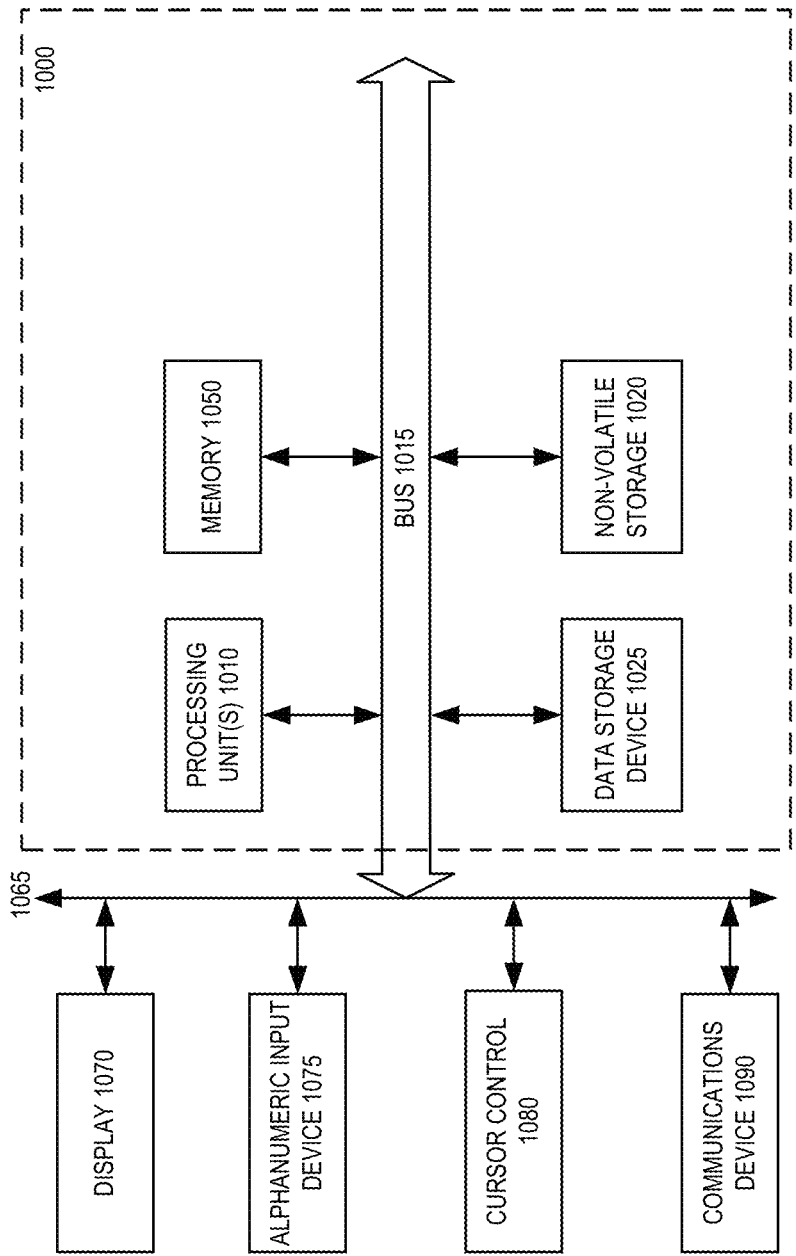
FIG. 10 is one embodiment of a computer system that may be used to support the systems and operations discussed herein, including those of the XR device

FIG. 10 is one embodiment of a computer system that may be used to support the systems and operations discussed herein, including those of the XR device. It will be apparent to those of ordinary skill in the art, however that other alternative systems of various system architectures may also be used.

The data processing system illustrated in FIG. 10 includes a bus or other internal communication means 1015 for communicating information, and one or more processor(s) 1010 coupled to the bus 1015 for processing information. The system further includes a random-access memory (RAM) or other volatile storage device 1050 (referred to as memory), coupled to bus 1015 for storing information and instructions to be executed by processor(s) 1010. Main memory 1050 also may be used for storing temporary variables or other intermediate information during execution of instructions by processor(s) 1010. The system also includes a read only memory (ROM) and/or static storage device 1020 coupled to bus 1015 for storing static information and instructions for processor(s) 1010, and a data storage device 1025 such as a magnetic disk or optical disk and its corresponding disk drive. Data storage device 1025 is coupled to bus 1015 for storing information and instructions.

The system may further be coupled to a display device 1070, such as a light emitting diode (LED) display or a liquid crystal display (LCD) coupled to bus 1015 through bus 1065 for displaying information to a computer user. An alphanumeric input device 1075, including alphanumeric and other keys, may also be coupled to bus 1015 through bus 1065 for communicating information and command selections to processor(s) 1010. An additional user input device is cursor control device 1080, such as a touchpad, mouse, a trackball, stylus, or cursor direction keys coupled to bus 1015 through bus 1065 for communicating direction information and command selections to processor 1010, and for controlling cursor movement on display device 1070.

Another device, which may optionally be coupled to computer system 1000, is a communication device 1090 for accessing other nodes of a distributed system via a network. The communication device 1090 may include any of a number of commercially available networking peripheral devices such as those used for coupling to an Ethernet, token ring, Internet, or wide area network. The communication device 1090 may further be a null-modem connection, or any other mechanism that provides connectivity between the computer system 1000 and the outside world. Note that any or all of the components of this system illustrated in FIG. 10 and associated hardware may be used in various embodiments as discussed herein.

There are a number of example embodiments described herein.

Example 1 is a method for controlling a user interface (UI), the method comprising: receiving selection of an object in the UI being displayed in a virtual environment created by an extend reality (XR) device; displaying, in the UI, a menu having one or more graphical user interface (GUI) elements selectable using a wearable device; receiving and translating first touch input data indicative of a user selection of one of the one or more GUI elements, the first touch input data being received in response to a user touching the wearable device; receiving additional touch input data from the wearable device and translating the additional touch data into one or more actions associated with the selected GUI element that is to be performed with respect to the object; and performing the one or more actions on the object in the UI being displayed in the virtual environment, including updating the UI based on results of performing the one or more actions.

Example 2 is the method of example 1 that may optionally include that the one or more GUI elements comprise one or more of a first GUI element to edit the object and a second GUI element to move the object based on head tracking data.

Example 3 is the method of example 1 that may optionally include that the one or more actions comprises: changing position of the object; rotating the object; and scaling the object.

Example 4 is the method of example 3 that may optionally include that the additional touch data for changing the position of the object is from the user moving at least one finger across a display interface of the wearable device.

Example 5 is the method of example 4 that may optionally include displaying a plurality of axis modes in the UI being displayed in the virtual environment, wherein the plurality of axis modes including an XY axis mode to indicate to the XR device that touch data received from moving the single finger across the display interface of the wearable device corresponds to movements in the X and Y axes, and an ZY axis mode to indicate to the XR device that touch data received from moving the single finger across the display interface of the wearable device corresponds to movements in the Z and Y axes; receiving a selection of the XY axis mode or the ZY axis mode; moving the object in according with the additional touch data and the selection of the XY axis mode or the ZY axis mode; and receiving touch data from the wearable device indicating the user has completed movement of the object.

Example 6 is the method of example 3 that may optionally include that the additional touch data for rotating the object is from the user moving at least one finger on a display interface of the wearable device in a circular direction, and further comprising receiving touch data from the wearable device indicating the user has completed rotation of the object.

Example 7 is the method of example 3 that may optionally include that the additional touch data for scaling the object is from the user moving at least one finger on a display interface of the wearable device, and further comprising receiving touch data from the wearable device indicating the user has completed scaling of the object.

Example 8 is the method of example 1 that may optionally include that the additional touch input data comprise touch data produced in response to movement of a single finger or multiple fingers of the user across a display interface of the wearable device.

Example 9 is the method of example 1 that may optionally include that the wearable device comprises a watch.

Example 10 is the method of example 1 that may optionally include that the watch comprises a smart watch device and the first touch data and the additional touch data are from a display interface of the smartwatch.

Example 11 is the method of example 1 that may optionally include displaying the user interface in a display of an extend reality (XR) device, the user interface (UI) including one or more objects; determining based on head tracking, by the XR device, that the user is looking at an object being displayed on the UI; and highlighting the object as a selected object in response to determining that the user is looking at the object;

Example 12 is a computing system for controlling a user interface, where the computing system comprises: one or more processors; and one or more memories storing instructions that, when executed by the one or more processors, cause the computing system to perform a process comprising: receiving selection of an object in the UI being displayed in a virtual environment created by an extend reality (XR) device; causing display, in the UI, a menu having one or more graphical user interface (GUI) elements selectable using a wearable device; receiving and translating first touch input data indicative of a user selection of one of the one or more GUI elements, the first touch input data being received in response to a user touching the wearable device; receiving additional touch input data from the wearable device and translating the additional touch data into one or more actions associated with the selected GUI element that is to be performed with respect to the object; and performing the one or more actions on the object in the UI being displayed in the virtual environment, including updating the UI based on results of performing the one or more actions.

Example 13 is the computing system of example 12 that may optionally include that the wearable device comprises a smartwatch device and the first touch data and the additional touch data are from a display interface of the smartwatch, and further wherein the one or more actions comprises: changing position of the object; rotating the object; and scaling the object.

Example 14 is the computing system of example 13 that may optionally include that the additional touch data for changing the position of the object is from the user moving at least one finger across a display interface of the wearable device.

Example 15 is the computing system of example 14 that may optionally include displaying a plurality of axis modes in the UI being displayed in the virtual environment, wherein the plurality of axis modes including an XY axis mode to indicate to the XR device that touch data received from moving the single finger across the display interface of the wearable device corresponds to movements in the X and Y axes, and an ZY axis mode to indicate to the XR device that touch data received from moving the single finger across the display interface of the wearable device corresponds to movements in the Z and Y axes; receiving a selection of the XY axis mode or the ZY axis mode; moving the object in according with the additional touch data and the selection of the XY axis mode or the ZY axis mode; and receiving touch data from the wearable device indicating the user has completed movement of the object.

Example 16 is the computing system of example 13 that may optionally include that the additional touch data for rotating the object is from the user moving at least one finger on a display interface of the wearable device in a circular direction, and further comprising receiving touch data from the wearable device indicating the user has completed rotation of the object.

Example 17 is the computing system of example 13 that may optionally include that the additional touch data for scaling the object is from the user moving at least one finger on a display interface of the wearable device, and further comprising receiving touch data from the wearable device indicating the user has completed scaling of the object.

Example 18 is the computing system of example 13 that may optionally include that the additional touch input data comprise touch data produced in response to movement of a single finger or multiple fingers of the user across a display interface of the wearable device.

Example 19 is one or more non-transitory computer readable storage media having instructions stored thereupon which, when executed by a system having at least a processor and a memory therein, cause the system to perform operations comprising: receiving selection of an object in the UI being displayed in a virtual environment created by an extend reality (XR) device; displaying, in the UI, a menu having one or more graphical user interface (GUI) elements selectable using a wearable device; receiving and translating first touch input data indicative of a user selection of one of the one or more GUI elements, the first touch input data being received in response to a user touching the wearable device; receiving additional touch input data from the wearable device and translating the additional touch data into one or more actions associated with the selected GUI element that is to be performed with respect to the object; and performing the one or more actions on the object in the UI being displayed in the virtual environment, including updating the UI based on results of performing the one or more actions.

Example 20 is one or more non-transitory computer readable storage media of claim 19 that may optionally include that the wearable device comprises a smartwatch device and the first touch data and the additional touch data are from a display interface of the smartwatch, and further wherein the one or more actions comprises: changing position of the object; rotating the object; and scaling the object.

It will be apparent to those of ordinary skill in the art that the system, method, and process described herein can be implemented as software stored in main memory or read only memory and executed by processor. This control logic or software may also be resident on an article of manufacture comprising a non-transitory computer readable medium having computer readable program code embodied therein and being readable by the mass storage device and for causing the processor to operate in accordance with the methods and teachings herein.

The embodiments discussed herein may also be embodied in a handheld or portable device containing a subset of the computer hardware components described above. For example, the handheld device may be a mobile telephone, tablet computer, special purpose computer device, etc. configured to contain only the bus, the processor, and memory. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor, a data storage device, a bus, and memory, and only rudimentary communications mechanisms, such as a small touch-screen that permits the user to communicate in a basic manner with the device. In general, the more special-purpose the device is, the fewer of the elements need be present for the device to function.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Whereas many alterations and modifications of the present disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the disclosure.

We claim:

1. A method for controlling a user interface (UI), the method comprising:
   receiving selection of an object in the UI being displayed in a virtual environment created by an extend reality (XR) device;
   displaying, in the UI, a menu having one or more graphical user interface (GUI) elements selectable using a wearable device;
   receiving and translating first touch input data indicative of a user selection of one of the one or more GUI elements, the first touch input data being received in response to a user touching the wearable device and including selection of a mode in which a user can move the object in two of three axes of an XYZ axis;

receiving additional touch input data from the wearable device and translating the additional touch data into one or more actions associated with the selected GUI element that is to be performed with respect to the object in the UI in the virtual environment, wherein the one or more actions comprises changing position of the object and the additional touch data for changing the position of the object is from the user moving at least one finger across a display interface of the wearable device; and performing the one or more actions on the object in the UI being displayed in the virtual environment, including updating the UI based on results of performing the one or more actions, wherein performing the one or more actions comprises moving the object in accordance with the additional touch data and the selection of the mode.

2. The method of claim 1 wherein the one or more GUI elements comprise one or more of a first GUI element to edit the object and a second GUI element to move the object based on head tracking data.

3. The method of claim 1 wherein the one or more actions comprises:

rotating the object; and scaling the object.

4. The method of claim 1 further comprising:

displaying a plurality of axis modes in the UI being displayed in the virtual environment, wherein the plurality of axis modes including an XY axis mode to indicate to the XR device that touch data received from moving the single finger across the display interface of the wearable device corresponds to movements in the X and Y axes, and an ZY axis mode to indicate to the XR device that touch data received from moving the single finger across the display interface of the wearable device corresponds to movements in the Z and Y axes;

receiving a selection of the XY axis mode or the ZY axis mode;

moving the object in according with the additional touch data and the selection of the XY axis mode or the ZY axis mode; and receiving touch data from the wearable device indicating the user has completed movement of the object.

5. The method of claim 3 wherein the additional touch data for rotating the object is from the user moving at least one finger on a display interface of the wearable device in a circular direction, and further comprising receiving touch data from the wearable device indicating the user has completed rotation of the object.

6. The method of claim 3 wherein the additional touch data for scaling the object is from the user moving at least one finger on a display interface of the wearable device, and further comprising receiving touch data from the wearable device indicating the user has completed scaling of the object.

7. The method of claim 1 wherein the additional touch input data comprise touch data produced in response to movement of a single finger or multiple fingers of the user across a display interface of the wearable device.

8. The method of claim 1 wherein the wearable device comprises a watch.

9. The method of claim 8 wherein the watch comprises a smart watch device and the first touch data and the additional touch data are from a display interface of the smartwatch.

10. The method of claim 1 further comprising:

displaying the user interface in a display of an extend reality (XR) device, the user interface (UI) including one or more objects;

determining based on head tracking, by the XR device, that the user is looking at an object being displayed on the UI; and highlighting the object as a selected object in response to determining that the user is looking at the object.

11. A computing system for controlling a user interface, the computing system comprising:

one or more processors; and one or more memories storing instructions that, when executed by the one or more processors, cause the computing system to perform a process comprising:

receiving selection of an object in the UI being displayed in a virtual environment created by an extend reality (XR) device;

causing display, in the UI, a menu having one or more graphical user interface (GUI) elements selectable using a wearable device;

receiving and translating first touch input data indicative of a user selection of one of the one or more GUI elements, the first touch input data being received in response to a user touching the wearable device and including selection of a mode in which a user can move the object in two of three axes of an XYZ axis;

receiving additional touch input data from the wearable device and translating the additional touch data into one or more actions associated with the selected GUI element that is to be performed with respect to the object in the UI in the virtual environment, wherein the one or more actions comprises changing position of the object and the additional touch data for changing the position of the object is from the user moving at least one finger across a display interface of the wearable device; and performing the one or more actions on the object in the UI being displayed in the virtual environment, including updating the UI based on results of performing the one or more actions, wherein performing the one or more actions comprises moving the object in accordance with the additional touch data and the selection of the mode.

12. The computing system of claim 11 wherein the wearable device comprises a smartwatch device and the first touch data and the additional touch data are from a display interface of the smartwatch, and further wherein the one or more actions comprises:

changing position of the object; rotating the object; and scaling the object.

13. The computing system of claim 12 wherein the additional touch data for changing the position of the object is from the user moving at least one finger across a display interface of the wearable device.

14. The computing system of claim 13 further comprising:

displaying a plurality of axis modes in the UI being displayed in the virtual environment, wherein the plurality of axis modes including an XY axis mode to indicate to the XR device that touch data received from moving the single finger across the display interface of the wearable device corresponds to movements in the X and Y axes, and an ZY axis mode to indicate to the XR device that touch data received from moving the single finger across the display interface of the wearable device corresponds to movements in the Z and Y axes;

receiving a selection of the XY axis mode or the ZY axis mode;

moving the object in according with the additional touch data and the selection of the XY axis mode or the ZY axis mode; and receiving touch data from the wearable device indicating the user has completed movement of the object.

15. The computing system of claim 12 wherein the additional touch data for rotating the object is from the user moving at least one finger on a display interface of the wearable device in a circular direction, and further comprising receiving touch data from the wearable device indicating the user has completed rotation of the object.

16. The computing system of claim 12 wherein the additional touch data for scaling the object is from the user moving at least one finger on a display interface of the wearable device, and further comprising receiving touch data from the wearable device indicating the user has completed scaling of the object.

17. The computing system of claim 12 wherein the additional touch input data comprise touch data produced in response to movement of a single finger or multiple fingers of the user across a display interface of the wearable device.

18. One or more non-transitory computer readable storage media having instructions stored thereupon which, when executed by a system having at least a processor and a memory therein, cause the system to perform operations comprising:

receiving selection of an object in the UI being displayed in a virtual environment created by an extend reality (XR) device;

displaying, in the UI, a menu having one or more graphical user interface (GUI) elements selectable using a wearable device;

receiving and translating first touch input data indicative of a user selection of one of the one or more GUI elements, the first touch input data being received in response to a user touching the wearable device and including selection of a mode in which a user can move the object in two of three axes of an XYZ axis;

receiving additional touch input data from the wearable device and translating the additional touch data into one or more actions associated with the selected GUI element that is to be performed with respect to the object in the UI in the virtual environment, wherein the one or more actions comprises changing position of the object and the additional touch data for changing the position of the object is from the user moving at least one finger across a display interface of the wearable device; and performing the one or more actions on the object in the UI being displayed in the virtual environment, including updating the UI based on results of performing the one or more actions, wherein performing the one or more actions comprises moving the object in accordance with the additional touch data and the selection of the mode.

19. The one or more non-transitory computer readable storage media of claim 18 wherein the wearable device comprises a smartwatch device and the first touch data and the additional touch data are from a display interface of the smartwatch, and further wherein the one or more actions comprises: changing position of the object; rotating the object; and scaling the object.

* * * * *